United States Patent
Liang et al.

(10) Patent No.: US 8,537,142 B2
(45) Date of Patent: Sep. 17, 2013

(54) STYLUS

(75) Inventors: Shi-Xu Liang, Shenzhen (CN); Jun-Lin Chen, Shenzhen (CN); Choon-Kit Lee, Santa Clara, CA (US); Chung-Yeh Sa, Santa Clara, CA (US)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 621 days.

(21) Appl. No.: 12/825,452

(22) Filed: Jun. 29, 2010

(65) Prior Publication Data

US 2011/0074741 A1    Mar. 31, 2011

(51) Int. Cl.
*G06F 3/033*    (2013.01)
(52) U.S. Cl.
USPC .......................................... 345/179; 178/19.01

(58) Field of Classification Search
USPC ........................................ 345/179; 178/19.01
See application file for complete search history.

(56) References Cited

U.S. PATENT DOCUMENTS

| | | | | |
|---|---|---|---|---|
| 6,752,557 B1 * | 6/2004 | Hsieh | ............................ | 401/117 |
| 6,921,225 B1 * | 7/2005 | Hsu | ................................ | 401/117 |
| 7,431,528 B2 * | 10/2008 | Liu | ................................ | 401/258 |
| 2001/0051068 A1 * | 12/2001 | Wang | ............................. | 401/131 |
| 2003/0184529 A1 * | 10/2003 | Chien et al. | ................... | 345/179 |
| 2007/0024601 A1 * | 2/2007 | Liu et al. | ...................... | 345/179 |
| 2009/0122029 A1 * | 5/2009 | Sin | ................................. | 345/179 |

* cited by examiner

*Primary Examiner* — LaTanya Bibbins
(74) *Attorney, Agent, or Firm* — Altis Law Group, Inc.

(57) ABSTRACT

A stylus is disclosed including a main barrel, a main body receiving the main barrel, a stylus cover covering the main body, and a sliding rod assembled to the main barrel. The main body is slidably assembled to the sliding rod to transfer between being latched inside the main barrel and being exposed out of the main barrel.

18 Claims, 7 Drawing Sheets

STYLUS

CROSS-REFERENCE TO RELATED APPLICATIONS

This application is one of the nine related co-pending U.S. patent applications listed below. All listed applications have the same assignees. The disclosure of each of the listed applications is incorporated by reference into all the other listed applications.

| application No. | Title | Inventors |
| --- | --- | --- |
| 12/610,500 | STYLUS | Wang et al. |
| 12/825,452 | STYLUS | Liang et al. |
| 12/791,050 | TOUCH STYLUS | Shi-Xu Liang |
| 12/813,607 | TOUCH STYLUS FOR ELECTRONIC DEVICE | Shi-Xu Liang |
| 12/814,561 | STYLUS | Liang et al. |
| 12/795,820 | STYLUS | Shi-Xu Liang |
| 12/819,290 | STYLUS | Shi-Xu Liang |
| 12/819,292 | STYLUS | Shi-Xu Liang |
| 12/819,294 | STYLUS | Shi-Xu Liang |

BACKGROUND

1. Technical Field

The present disclosure relates to styluses, and particularly, to a stylus used with portable electronic devices.

2. Description of the Related Art

With the development of wireless communication and information processing technologies, portable electronic devices, such as mobile phones and personal digital assistants (PDAs), are now in widespread use.

Styluses are usually provided and are secured within the outside wall of the portable electronic device for inputting information. The stylus need to be small or thin for a compact requirement of the portable electronic device. However, they may be uncomfortable to use.

Therefore, there is room for improvement within the art.

BRIEF DESCRIPTION OF THE DRAWINGS

Many aspects of the present stylus and the portable electronic device using the same can be better understood with reference to the following drawings. The components in the drawings are not necessarily drawn to scale, the emphasis instead being placed upon clearly illustrating the principles of the present stylus and a portable electronic device using the same. Moreover, in the drawings, like reference numerals designate corresponding parts throughout the several views.

DETAILED DESCRIPTION

Figure 1:
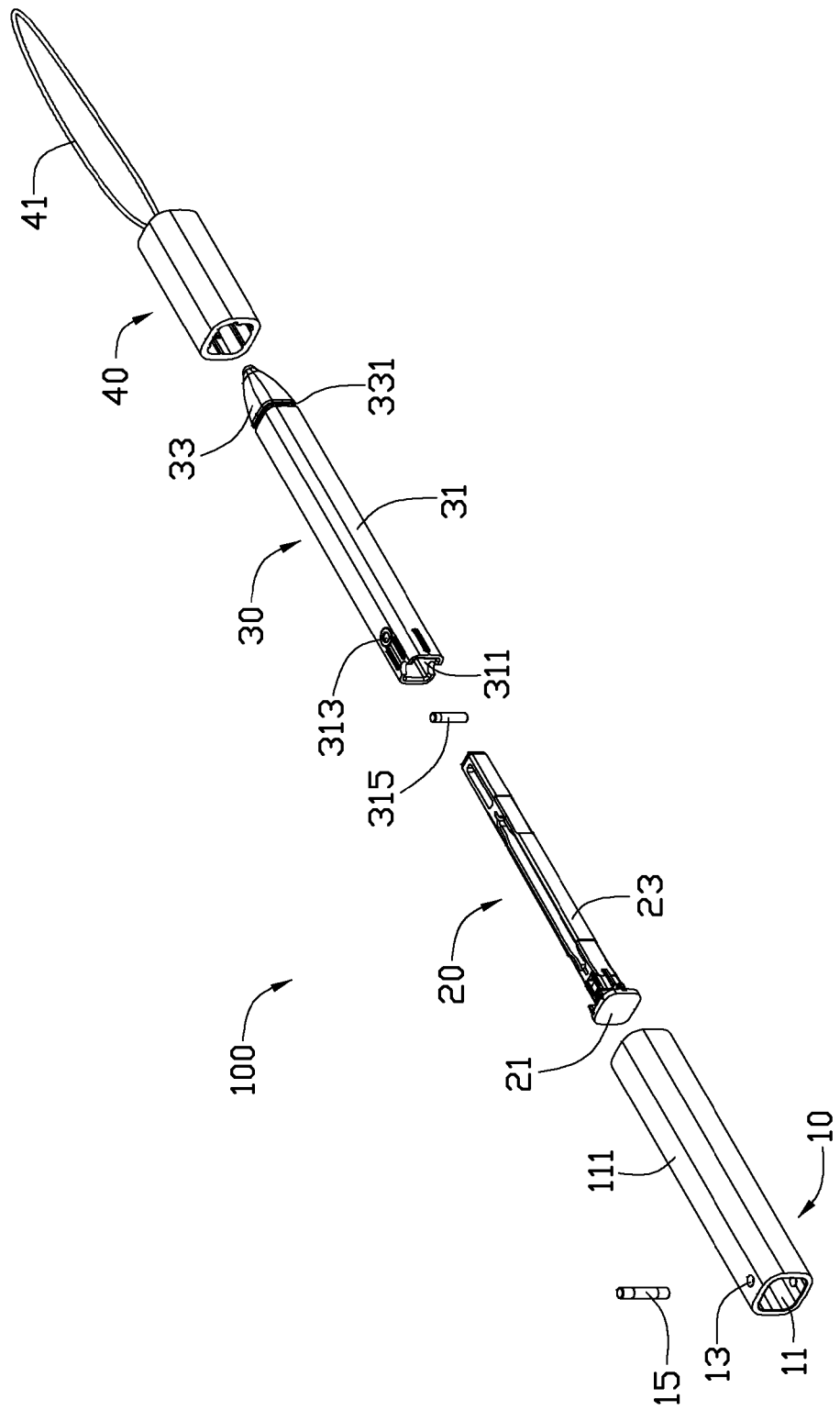
FIG. 1 is an isometric view of an exemplary stylus according to an embodiment.

FIG. 1 shows an exemplary stylus 100 used in a portable electronic device such as a mobile phone, or a personal digital assistant (PDA), including a main barrel 10, a sliding rod 20, a main body 30 and a stylus cover 40. The sliding rod 20 and the main body 30 are assembled within the main barrel 10. The stylus cover 40 is mounted to the end of the main barrel 10.

The main barrel 10 is generally hollow defining an accommodating cavity 11. The accommodating cavity 11 is enclosed by sidewalls 111. The main barrel 10 further includes two opposite latching holes 13 and a securing pin 15. The two latching holes 13 are defined through and aligned substantially perpendicularly to two parallel sidewalls 111. The securing pin 15 can engage through and secure into the latching hole 13. When the latching hole 13 secures the securing pin 15, the opposite ends of the securing pin 15 are coplanar (flush) with the corresponding exterior surfaces of the sidewalls 111, respectively.

Figure 2:
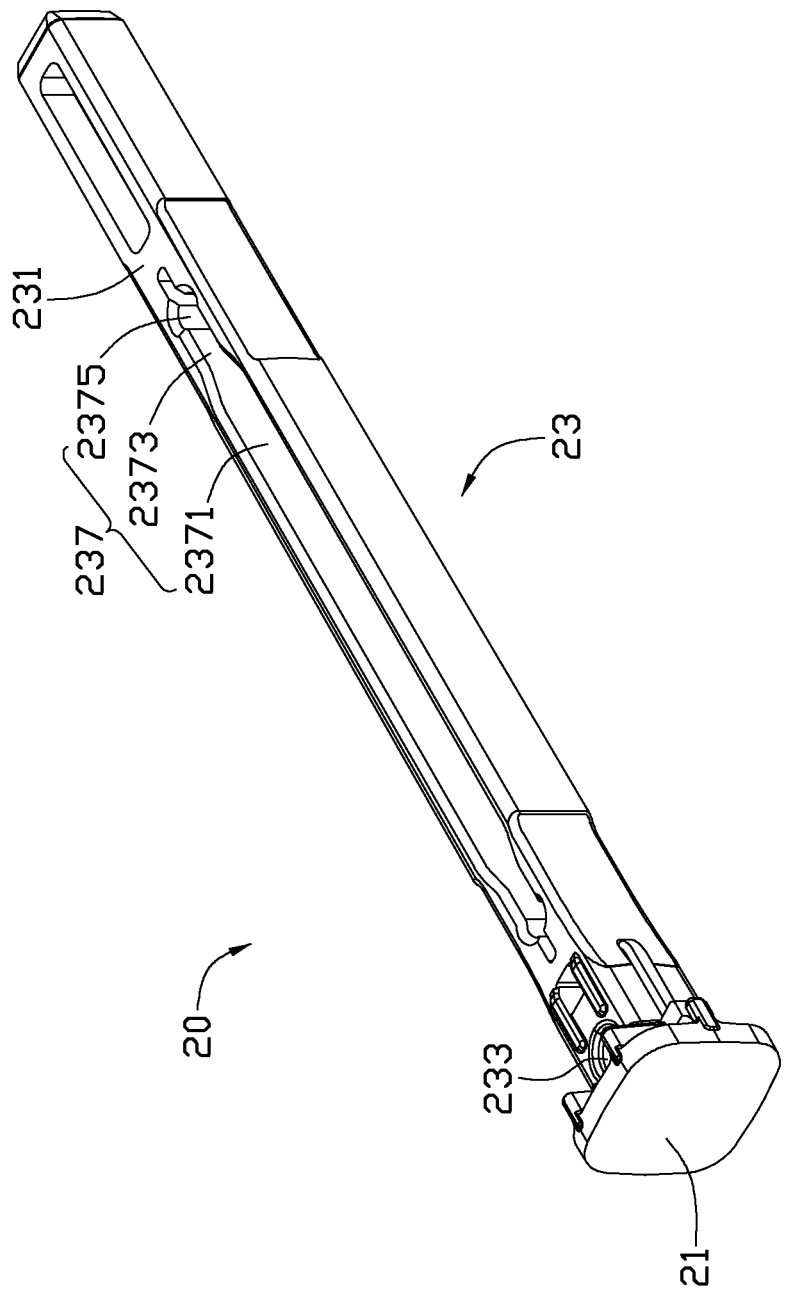
FIG. 2 is an enlarged view of a sliding rod of the stylus shown in FIG. 1.

FIG. 2 shows the sliding rod 20 having substantially the length with the main barrel 10, and accordingly can be accommodated completely inside the main barrel 10. The sliding rod 20 includes a rod base 21 and a rod body 23. The rod base 21 has substantially the same shape and size with the accommodating cavity 11 to be slidably received in the accommodating cavity 11. The rod body 23 protrudes substantially perpendicularly from the surface of the rod base 21. The rod body 23 includes an exterior wall 231 and a securing holes 233. The securing holes 233 have substantially the same shape and size as the latching hole 13, and are defined through the exterior wall 231 adjacent to the rod base 21. The securing holes 233 secures the securing pin 15 therein for securing the sliding rod 20 with the main barrel 10.

The exterior wall 231 further defines a through longitudinal sliding groove 237. The sliding groove 237 includes a sliding section 2371, two opposite limiting sections 2373 and two opposite securing sections 2375. The sliding section 2371 is located between and communicates with the two limiting sections 2373. The securing sections 2375 are positioned at opposite ends of the sliding groove 237 and communicate with the limiting sections 2373 respectively. Each limiting section 2373 is located between and narrower than the sliding section 2371 and the securing section 2375.

FIG. 1 shows the hollow main body 30 including a hollow body section 31 and a head section 33 connecting the hollow body section 31. The body section 31 has substantially the same shape and size as the accommodating cavity 11. The body section 31 includes a receiving space 311, two positioning holes 313 and a positioning pin 315. The body section 31 can receive rod body 23 therein. The two positioning holes 313 are defined through the body section 31 in communication with the receiving space 311 for latching the positioning pin 315 therein. The positioning pin 315 can be secured in the securing sections 2375 and the positioning holes 313 to secure the main body 30 with the sliding rod 20. The head section 33 is opposite to the positioning holes 313 and defines a wedge-shaped latching slit 331 on the periphery of the main body 30.

Figure 4:
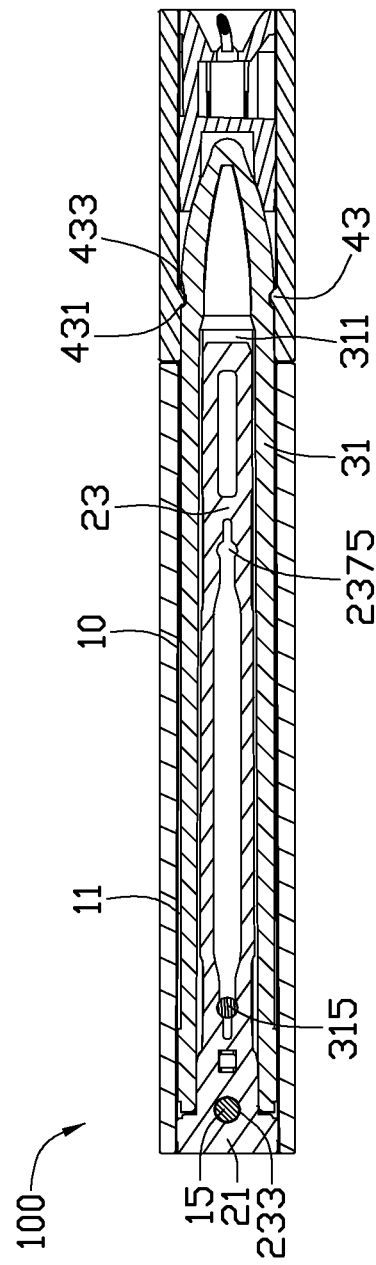
FIG. 4 is a cross sectional view of the assembled stylus shown in FIG. 3.
Figure 5:
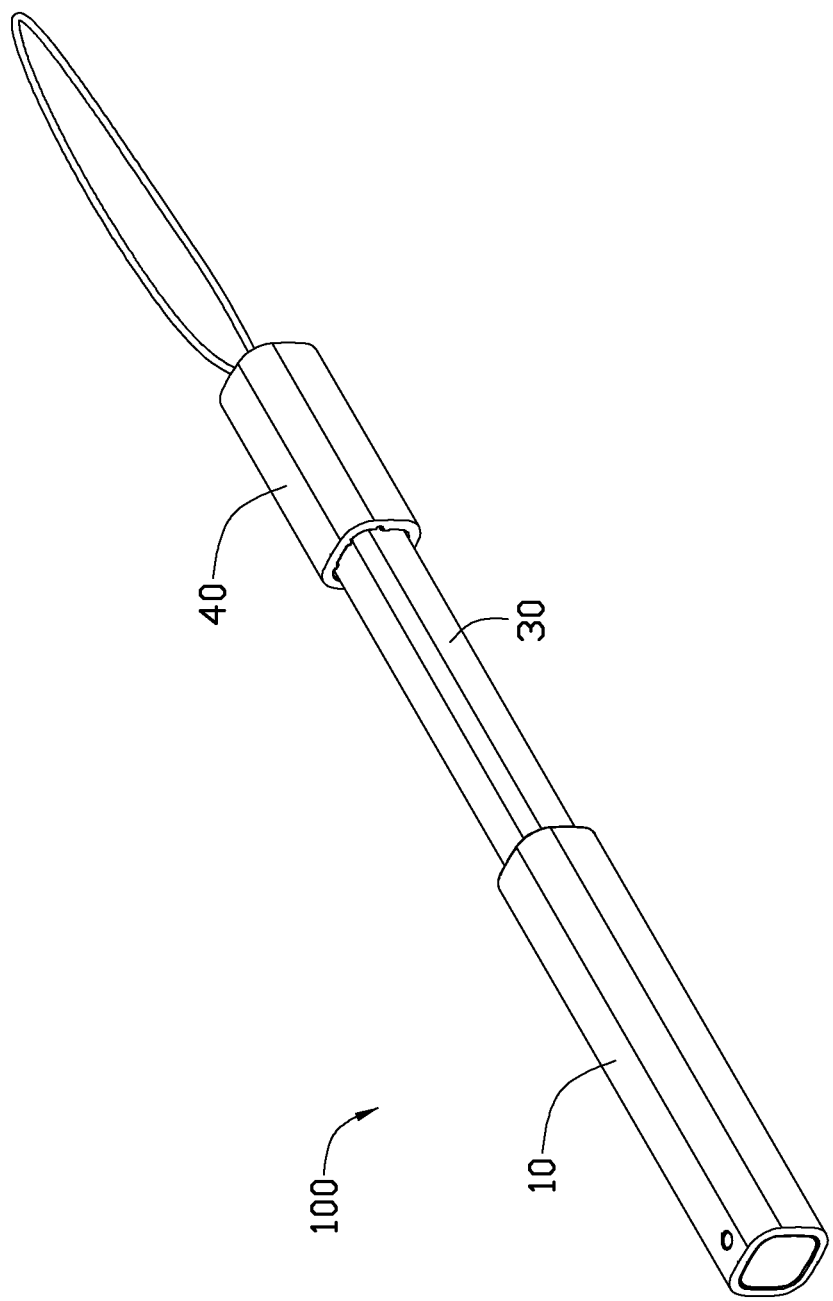
FIG. 5 is another assembled view of the stylus shown in FIG. 1, the main body partially exposed to the outside.
Figure 6:
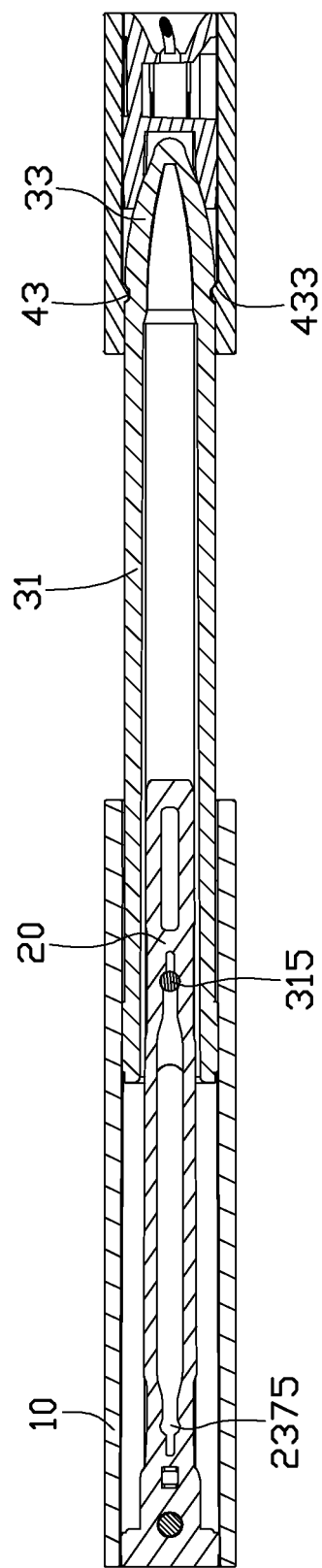
FIG. 6 is a cross sectional view of the assembled stylus shown in FIG. 5.
Figure 7:
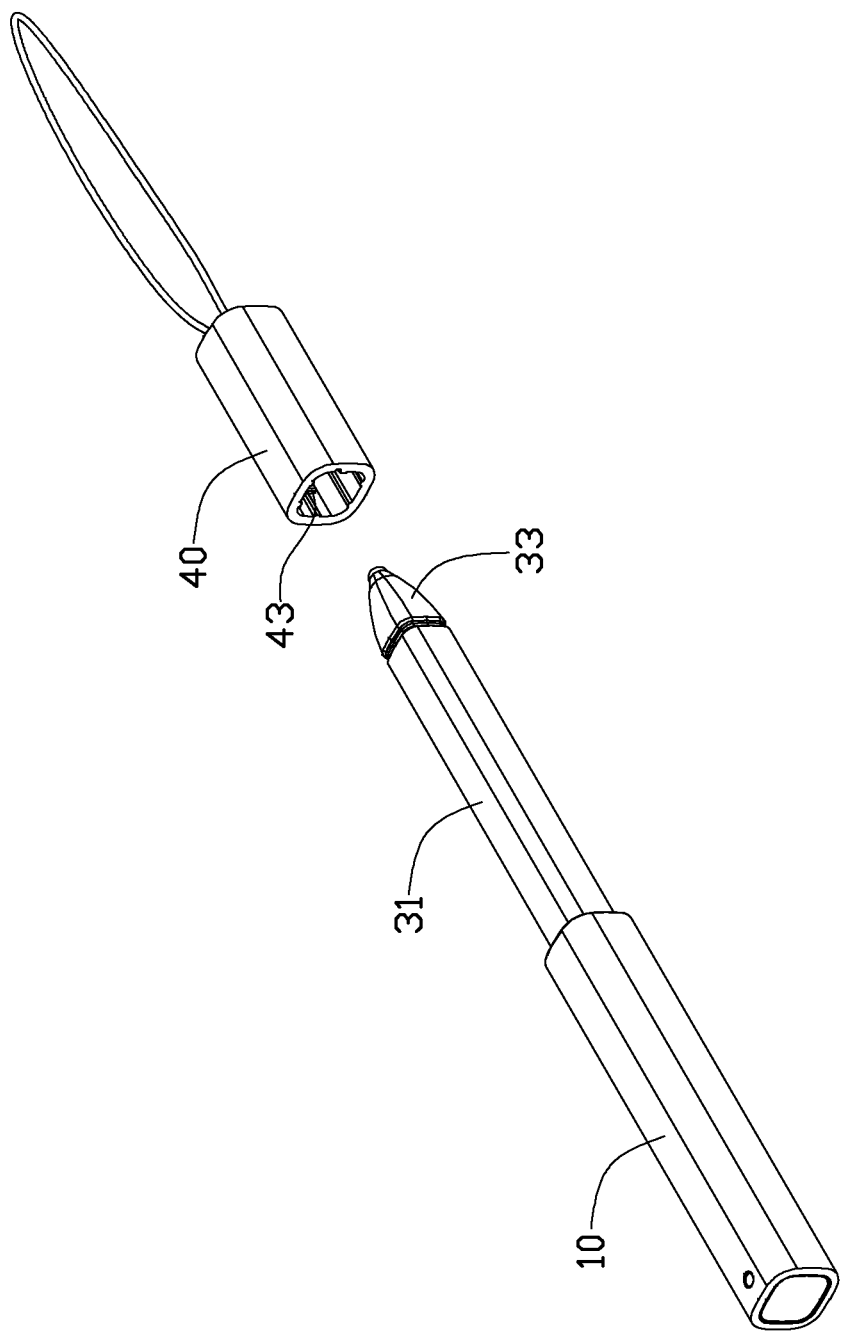
FIG. 7 is another assembled view of the stylus shown in FIG. 1, the main body completely exposed to the outside.

FIGS. 1 and 4 show the hollow stylus cover 40 having an end connected with a string 41, and an opposite end integrally formed with e.g. two opposite latching portions 43 on the interior wall. The string 41 can be threaded into a connecting hole in an outside portion of the portable electronic device, enabling the securing of the stylus 100 with the portable electronic device. The latching portions 43 can latch in the latching slit 331. Each latching portion 43 has a wedge-shaped section and includes a limiting wall 431 and an opposite resisting wall 433. The limiting wall 431 is generally perpendicular with the interior wall of the stylus cover 10, and the resisting wall 433 is inclined relative to the interior wall of the stylus cover 10.

Figure 3:
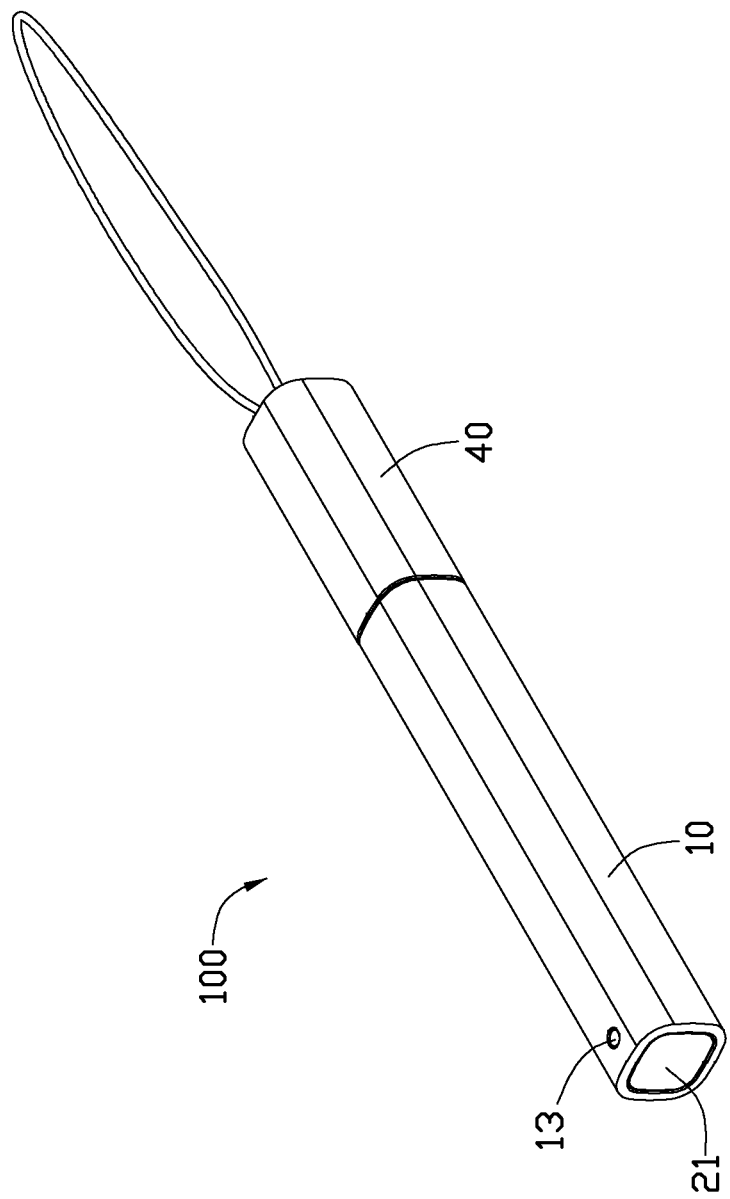
FIG. 3 is an assembled view of the stylus shown in FIG. 1.

FIGS. 3 and 4 show an assembly of the stylus 100. The rod body 23 is placed into the receiving space 311 with the positioning holes 313 aligning with the securing sections 2375. The positioning holes 313 and the securing sections 2375 secures the positioning pin 315. At this time, the main body 30 is slidably mounted on the sliding rod 20. The assembled unit of the main body 30 and the sliding rod 20 is placed into the accommodating cavity 11 with the rod base 21 near the latching hole 13 and the securing holes 233 aligned with the latching hole 13. The securing holes 233 and the latching hole 13 latch the securing pin 15 therein, and accordingly the main barrel 10 latches with the sliding rod 20 and the main body 30. The latching slit 331 latches the latching portions 43 therein with the limiting walls 431 and the resisting walls 433 resisting against the interior wall of the latching slit 331, latching the stylus cover 40 with the head section 33 accordingly, the assembly of the stylus 100 is completed.

FIGS. 4 through 7 show a process of changing the stylus 100 from a closed position to an open position. The stylus cover 40 is pulled away from the main barrel 10. Due to the fixing of the sliding rod 20 with the main barrel 10 and the latching of the latching portions 43 into the latching slit 331, the head section 33 and the body section 31 move relative to the sliding rod 20 and the main barrel 10. In this process, the positioning pin 315 passes one of the limiting section 2373 into the sliding section 2371, slides along the sliding section 2371 and passes the other limiting section 2373 to latch into the securing sections 2375 distal to the rod base 21. At this time, the body section 31 is exposed completely out of the main barrel 10. The stylus cover 40 can be further pulled to release the latching of the latching portions 43 and the latching slit 331 and accordingly removed away from the main body 30. When the head section 33 is exposed the stylus 100 is ready for use.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A stylus, comprising:
   a main barrel;
   a main body receiving the main barrel;
   a stylus cover covering the main body; and
   a sliding rod assembled to the main barrel, the main body slidably assembled to the sliding rod to transfer between being latched inside the main barrel and being exposed out of the main barrel;
   wherein the sliding rod comprises a rod body and a sliding groove defined in the rod body; the main body comprises two positioning holes defined through the main body and a positioning pin secured in the positioning holes and slidably within the sliding groove.

2. The stylus as claimed in claim 1, wherein:
   the sliding groove comprises a sliding section, two limiting sections and two securing sections, the sliding section communicating with the limiting sections and the securing sections,
   the positioning pin is secured in one of the securing sections, and can pass one of the limiting section from the securing section, slide along the sliding section to pass the other limiting section to secure in the other securing section when the main body is slidably transferred between being latched inside the main barrel and being exposed out of the main barrel.

3. The stylus as claimed in claim 2, wherein the limiting sections are narrower than the securing sections.

4. The stylus as claimed in claim 2, wherein the main body comprises a receiving space, the rod body slidably within the receiving space.

5. The stylus as claimed in claim 1, wherein the main body further comprises a latching slit, the stylus cover comprises latching portions, and the latching portions are latched in the latching slit.

6. The stylus as claimed in claim 5, wherein the main body further comprises a body section and a head section, the head section protruding from an end of the body section, the latching slit recessed in the head section.

7. The stylus as claimed in claim 1, wherein the main barrel comprises an accommodating cavity for accommodating the sliding rod.

8. The stylus as claimed in claim 7, wherein:
   the main barrel further comprises two opposite positioning holes and a positioning pin, the positioning holes defined through the main barrel; and
   the rod body defines positioning holes, the positioning pin fixed in the positioning holes to fix the sliding rod in the main barrel.

9. The stylus as claimed in claim 1, further comprising a string attached to the stylus cover.

10. A stylus, comprising:
    a main barrel;
    a main body receiving the main barrel;
    a stylus cover covering and latched to one end of the main body; and
    a sliding rod fixed to the main barrel, the sliding rod comprising a rod body, wherein the rod body defines a sliding groove, the stylus cover integral with the main body slidable along the sliding groove of the sliding rod for exposing out of the main barrel, the stylus cover removed from the main body after the exposing the main body from the main barrel;
    wherein the main body comprises two positioning holes defined through the main body and a positioning pin; and
    the positioning pin secured in the positioning holes and slidably within the sliding groove.

11. The stylus as claimed in claim 10, wherein:
    the sliding groove comprises a sliding section, two limiting sections and two securing sections, the sliding section communicating with the limiting sections and the securing sections,
    the positioning pin is secured in one of the securing sections, and can pass one of the limiting section from the securing section, slide along the sliding section to pass the other limiting section to secure in the other securing section when the main body is slidably transferred between being latched inside the main barrel and being exposed out of the main barrel.

12. The stylus as claimed in claim 11, wherein the limiting sections are narrower than the securing sections.

13. The stylus as claimed in claim 11, wherein the main body comprises a receiving space, the rod body slidably within the receiving space.

14. The stylus as claimed in claim 10, wherein the main body further comprises a latching slit, the stylus cover comprises latching portions, and the latching portions are latched in the latching slit.

15. The stylus as claimed in claim 14, wherein the main body further comprises a body section and a head section, the head section protruding from an end of the body section, the latching slit recessed in the head section.

16. The stylus as claimed in claim 10, wherein the main barrel comprises a accommodating cavity for accommodating the sliding rod.

17. The stylus as claimed in claim 16, wherein:
   the main barrel further comprises two opposite positioning holes and a positioning pin, the positioning holes defined through the main barrel; and
   the rod body defines positioning holes, the positioning pin fixed in the positioning holes to fix the sliding rod in the main barrel.

18. The stylus as claimed in claim 10, further comprising a string attached to the stylus cover.

* * * * *